ized in that an aluminum containing component and a

United States Patent
Nicolai et al.

(12) United States Patent
Nicolai et al.

(10) Patent No.: US 7,288,146 B1
(45) Date of Patent: Oct. 30, 2007

(54) TITANIUM DIOXIDE PIGMENT COATED WITH HOLLOW BODIES AND METHOD FOR ITS MANUFACTURE

(75) Inventors: Lydia Drews Nicolai, Köln (DE); Siegfried Blümel, Ratingen (DE)

(73) Assignee: Kronos International, Inc., Leverkusen (DE)

( * ) Notice: Subject to any disclaimer, the term of this patent is extended or adjusted under 35 U.S.C. 154(b) by 0 days.

(21) Appl. No.: 11/710,665

(22) Filed: Feb. 23, 2007

Related U.S. Application Data

(60) Provisional application No. 60/789,365, filed on Apr. 5, 2006.

(30) Foreign Application Priority Data

Mar. 16, 2006 (DE) .................. 10 2006 012 564

(51) Int. Cl.
*C09C 1/36* (2006.01)
*D21H 19/38* (2006.01)

(52) U.S. Cl. .............. 106/443; 427/215; 427/218; 427/439; 428/403; 428/537.5

(58) Field of Classification Search ............ 106/443; 427/215, 218, 439; 428/403, 537.5
See application file for complete search history.

(56) References Cited

U.S. PATENT DOCUMENTS

| | | | |
|---|---|---|---|
| 5,650,002 A | 7/1997 | Bolt | |
| 5,665,466 A | 9/1997 | Guez et al. | |
| 5,886,069 A | 3/1999 | Bolt | |
| 5,942,281 A | 8/1999 | Guez et al. | |
| 6,143,064 A | 11/2000 | Virtanen | |
| 6,962,622 B2 | 11/2005 | Bender et al. | |
| 2003/0024437 A1 | 2/2003 | Wen et al. | |

FOREIGN PATENT DOCUMENTS

| | | |
|---|---|---|
| DE | 10115544 A1 | 3/2001 |
| EP | 0861299 B1 | 4/2000 |
| EP | 0713904 B1 | 7/2000 |
| WO | WO 97/32934 | 9/1997 |
| WO | WO 02/74431 | 3/2002 |

OTHER PUBLICATIONS

Caruso, et al., Nanoengineering of Inorganic and Hybrid Hollow Spheres by Colloidal Templating, SCIENCE, Nov. 6, 1998, 1111-1114, vol. 282, USA.
McDonald et al., Hollow Latex Particles: Synthesis and Applications, Advances in Colloid and Interface Science, 2002, 181-213, 99, The Dow Chemical Co., Midland, MI.
Qualitatsverbesserung, Phanomen Farbe, Dec. 1998+Jan. 1999, 39-43, Germany.

*Primary Examiner*—Anthony J. Green
(74) *Attorney, Agent, or Firm*—Locke Liddell & Sapp PLLC

(57) ABSTRACT

A coated titanium dioxide pigment with good opacity and simultaneously good retention for use in decorative laminating paper characterized by a surface coating containing aluminum oxide phosphate and attached hollow bodies, e.g., hollow microbodies. A manufacturing method is characterized in that an aluminum containing component and a phosphorus containing component are first added to a $TiO_2$ suspension, during which time the pH value does not drop below 10. The hollow bodies are subsequently added, followed by addition of at least one acidic component, as a result of which the pH value of the suspension is lowered to the range from about 4 to 9. In an alternative embodiment of the method, the suspension has a pH value of under 4 at the time of addition of the aluminum containing component and a phosphorus containing component.

20 Claims, 1 Drawing Sheet

TITANIUM DIOXIDE PIGMENT COATED WITH HOLLOW BODIES AND METHOD FOR ITS MANUFACTURE

RELATED APPLICATION

This application claims the benefit of U.S. Provisional patent application Ser. No. 60/789,365 filed Apr. 5, 2006 and entitled "Titanium Dioxide Pigment Coated with Micro Hollow Sphere and Process for Manufacturing" and the benefit of DE 10 2006 012 564 filed Mar. 16, 2006.

TECHNICAL FIELD OF THE INVENTION

This invention relates to a titanium dioxide pigment of high opacity, a method for its manufacture and its use in decorative laminating papers or decorative foils.

BACKGROUND OF THE INVENTION

Decorative laminating papers and decorative foils are part of a decorative, thermosetting coating material, used with preference for finishing furniture surfaces, for laminate flooring and in interior finishing. The term "laminates" is used to denote materials in which, for example, several impregnated, stacked layers of paper, or paper and hardboard or fiberboard, are pressed together. The use of special synthetic resins achieves extraordinarily high resistance of the laminates to marring, impact, chemicals and heat.

The use of decorative laminates makes it possible to produce decorative surfaces, where the decorative laminating paper serves not only as facing paper, e.g. to hide unattractive wood material surfaces, but also as a carrier for the synthetic resin. The demands imposed on decorative laminating paper include, among others, opacity (hiding power), light-fastness (greying resistance), color-fastness, wet strength, suitability for impregnation and printability.

The economic efficiency of the manufacturing process for decorative laminating papers is determined by, among other things, the opacity of the pigment in the paper. In principle, a pigment based on titanium dioxide is eminently suitable for achieving the necessary opacity of the decorative laminating paper. During paper manufacture, a titanium dioxide pigment, or a titanium dioxide pigment suspension, is usually mixed with a pulp suspension. In addition to pigment and pulp as the feedstock, use is generally also made of auxiliaries, such as wet-strength agents, and further additives where appropriate. The interactions of the individual components (pulp, pigment, auxiliaries and additives, water) with each other contribute to formation of the paper and determine the retention of the pigment. Retention is the capacity for retaining all inorganic substances in the paper during production.

It is known that an improvement in opacity can be achieved by special treatment of the surface of the titanium dioxide pigment.

U.S. Pat. No. 5,942,281 A and U.S. Pat. No. 5,665,466 A describe a surface treatment in which a first layer of aluminium oxide phosphate is applied at an acidic pH value of 4 to 6, and a second layer of aluminium oxide is precipitated in a pH range from 3 to 10, preferably at roughly pH 7. An improvement in retention is achieved by a third layer consisting of magnesium oxide, the result being that the pigment produced is characterized by consecutive layers of aluminium oxide phosphate, aluminium oxide and magnesium oxide.

U.S. Pat. No. 6,962,622 B2 discloses a titanium dioxide pigment blend that is composed of a pigment with high greying resistance (pigment Type A) and a pigment with a coating displaying an elevated $SiO_2$ and $Al_2O_3$ content, precipitated in fluffy form (pigment Type B).

U.S. Pat. No. 6,143,064 A describes the coating of pigment particles with precipitated calcium carbonate, where the size of the calcium carbonate particles is between 30 and 100 nm. The titanium dioxide coated with calcium carbonate achieves higher opacity in the paper. In this context, the calcium particles assume the function of spacers, such that the pigment particles display better distribution in the paper. The minimum distance between the pigment particles is said to correspond roughly to the size of the pigment particles.

U.S. Pat. No. 5,886,069 A and U.S. Pat. No. 5,650,002 A describe TiO2 pigment particles displaying both a continuous inorganic coating and a coating of discrete inorganic particles with a diameter of 5 to 100 nm. The surface coating sequence can be selected at random, as can the form of the discrete particles. Production is performed by mixing a colloidal suspension of the discrete particles with a $TiO_2$ slurry.

U.S. Publication 2003 0024437 A1 discloses a pigment blend with pigment particles onto whose surface solid spherical particles, such as calcium carbonate, silicon oxide, aluminium oxide, zirconium oxide or titanium oxide, have been precipitated in-situ.

A need has arisen for an alternative titanium dioxide pigment with good opacity and good retention for use in decorative laminating papers. A need has further arisen for a method for manufacturing a titanium dioxide pigment of this kind.

SUMMARY OF THE INVENTION

In accordance with the present invention, a novel titanium dioxide pigment contains titanium dioxide particles and where a layer containing aluminium phosphate, aluminium oxide and hollow bodies is located on the particle surface. The entrapped air in the hollow bodies affords improved opacity over prior art coatings.

A method for manufacturing a coated titanium dioxide pigment includes:

a) Provision of an aqueous suspension of uncoated titanium dioxide particles, b) Addition of an aluminium component and a phosphorus component, c) Addition of hollow bodies, d) Setting of the pH value of the suspension to a value in the range of about 4 and 9.

BRIEF DESCRIPTION OF THE DRAWINGS

For a more complete understanding of the present invention and for further advantages thereof, reference is now made to the following Description of the Preferred Embodiments taken in conjunction with the accompanying Drawings in which.

DESCRIPTION OF THE PREFERRED EMBODIMENTS

Figure 1:
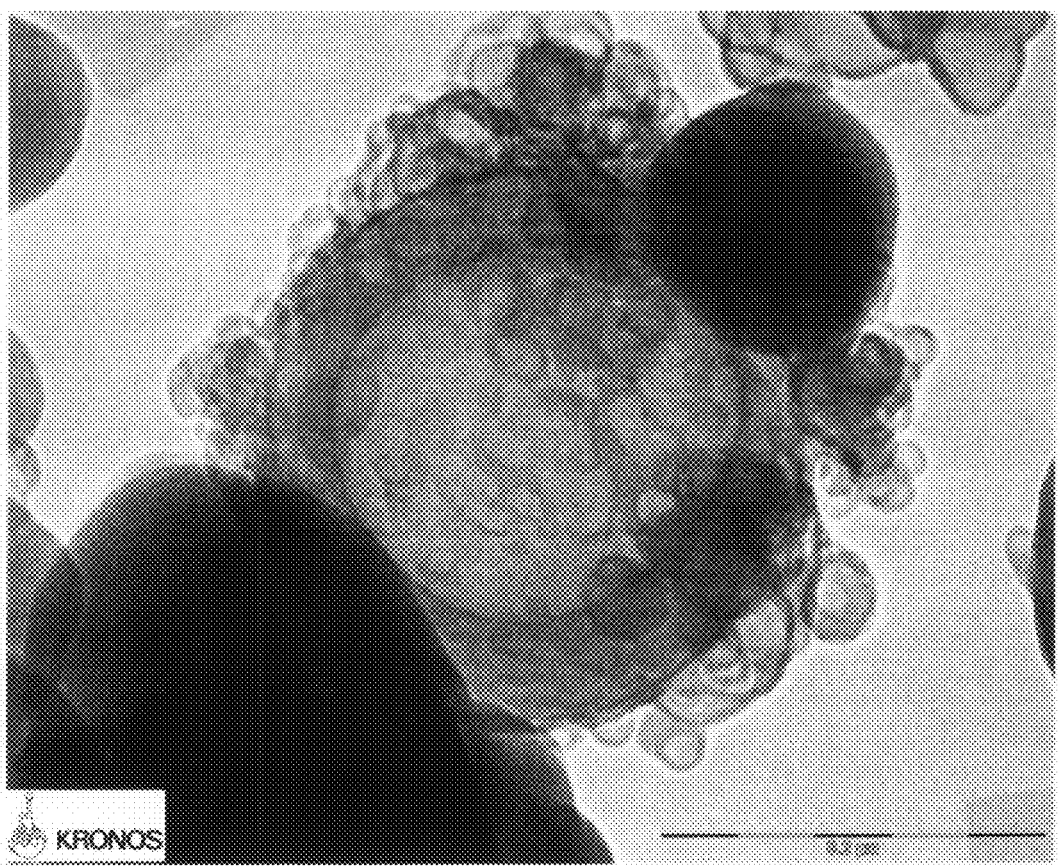
FIG. 1 is an electron micrograph showing the present invention.

Here and below, the term "oxide" is to be taken to also mean the corresponding hydrous oxides or the hydrates. All data disclosed below regarding pH value, temperature, concentration in % by weight or % by volume, etc., are to be interpreted as including all values lying in the range of the respective measuring accuracy known to the person skilled in the art. When used in the context of the present description the term "significant quantity" or "significant content" indicates the minimum quantity of a component, upwards of which the properties of the mixture are affected in the framework of the measuring accuracy.

The titanium dioxide pigment according to the present invention is characterized by the use of hollow bodies. The hollow bodies can include spherical shapes or spheres (also referred to as hollow spheres), including microbodies or microspheres. The invention includes the use of hollow bodies during post-treatment. The hollow bodies are attached to the particle surface and act as spacers between the individual pigment particles. The hollow bodies can be of an inorganic and organic nature. They preferably display a mean diameter of about 5 to 1,000 nm. The hollow bodies are characterized by the inclusion of air, where the inclusion of air may possibly not be present until after drying of the pigment.

Organic hollow bodies are used as extenders in paints, for example. The hollow bodies act as spacers between the pigment particles and, as a result of their entrapped air, lead to higher hiding power by exploiting the favorable difference between the refractive indices of the pigment and air ("Qualitätsverbesserung—Ropaque™ Opaque Polymer zur Qualitätsverbesserung von Lacken und Farben" [Quality Improvement—Ropaque™ Opaque Polymer for Improving the Quality of Paints and Coatings], Phänomen Farbe February 1998, January 1999, pp. 39-43). The publication "Hollow latex particles: synthesis and applications" (McDonald et al., *Advances in Colloid and Interface Science* 99 (2002) pp. 181-213) provides a review of the manufacture of organic hollow bodies. An exemplary description of the manufacture of inorganic hollow bodies is given in "Nanoengineering of Inorganic and Hybrid Hollow Spheres by Colloidal Templating" (Caruso et al., Science 1998, Vol. 282, pp. 1111-1114). The patent application WO 02/074431 A1 discloses the manufacture of inorganic hollow bodies and their use in catalysis and in photonics.

In the method according to the present invention, a layer of aluminum-phosphorus compounds in a blend with hollow bodies, including microspheres and, where appropriate, aluminum oxide, is precipitated on the $TiO_2$ particle surface. The composition is dependent on the quantities of the aluminum and phosphorus components used. For simplicity, this layer is referred to as the aluminum oxide phosphate/hollow sphere layer below.

The post-treatment method on which the present invention is based starts with an aqueous, and preferably wet-milled, $TiO_2$ suspension (Step a)). Where appropriate, wet-milling is performed in the presence of a dispersant. The $TiO_2$ comprises uncoated $TiO_2$ particles, i.e. $TiO_2$ base material particles, produced by the sulphate process (SP) or the chloride process (CP). The base material is usually stabilized, by addition of aluminum at a rate of about 0.3 to 3% by weight, calculated as Al2O3, and with an oxygen surplus of about 2 to 15% in the gas phase during oxidation of the titanium tetrachloride into titanium dioxide in the CP process, and by doping with Al, Sb, Nb or Zn, for example, in the SP process.

$TiO_2$ particles produced by the chloride process are used with preference. The method is performed at a temperature of under about 80° C., preferably at about 55° C. to 65° C.

The suspension in Step a) can be set to be either alkaline or acidic, with a pH value of preferably greater than about 9 and less than about 4.

In Step b), an aluminum and a phosphorus component are added. Suitable aluminum components for the surface treatment method according to the present invention are alkaline or acid-reacting, water-soluble salts, e.g. sodium aluminate, aluminium sulphate, aluminium nitrate, aluminium chloride, aluminium acetate, etc. This selection is not to be interpreted as a restriction. The aluminium component is to be added in a quantity of about 1.0 to 5.0% by weight, preferably 1.5 to 4.5% by weight, particularly 2.0% by weight, calculated as $Al_2O_3$ and referred to the $TiO_2$ particle.

Suitable phosphorus components are inorganic compounds, such as, for example, alkali phosphates, ammonium phosphate, polyphosphates, phosphoric acid, etc. This selection is not to be interpreted as a restriction. Particularly suitable are disodium hydrogenphosphate or phosphoric acid. The phosphorus component is added in a concentration of about 1.0 to 5.0% by weight, preferably 1.5 to 4.0% by weight, particularly 2.0 to 3.0% by weight, calculated as $P_2O_5$ and referred to the $TiO_2$ particle.

The Al and the P component can be added to the suspension in any order, individually one after the other, or simultaneously.

A subsequent Step c) involves the addition of organic or inorganic hollow bodies with a mean diameter of about 5 to 1,000 nm, preferably of 400 to 600 nm.

The product Ropaque™ from Rohm & Haas, for example, may be used as organic hollow bodies. Ropaque™ consists of styrene/acrylic copolymer hollow spheres. Other latex or polymer hollow bodies are also suitable. However, this list is not to be interpreted as a restriction of the present invention. Rather, all organic hollow bodies that display the required particle diameter in the range from about 5 to 1,000 nm and are stable at the pH values occurring can be used with the present invention.

The inorganic hollow spheres described in the prior art include both glass hollow spheres and ceramic hollow spheres in general, and also $TiO_2$ hollow spheres in particular. It is again the case here that all kinds of inorganic hollow bodies can in principle be used in the framework of the present invention, provided that they display the required mean particle diameter of about 5 to 1,000 nm and provided that they are stable at the pH values occurring. The person skilled in the art will select the appropriate hollow bodies on the basis of framework conditions, such as processibility, cost, etc.

The hollow bodies are added in a quantity of about 1 to 15% by weight, referred to the uncoated $TiO_2$ particles.

In a further subsequent Step d), the pH value of the suspension is set to a value in the range from about 4 to 9 by adding a pH-regulating component. The pH-regulating component used can be an acid or a lye. Examples of the acid that can be used are sulphuric acid, hydrochloric acid, phosphoric acid or another suitable acid. Moreover, a corresponding acid-reacting salt, such as aluminium sulphate, can also be used in place of the acid. It is furthermore possible to use an acidic metal salt solution, e.g. of cerium, titanium or zirconium, such that precipitation takes place jointly with the aluminium oxide phosphate/hollow sphere layer. Sodium hydroxide solution is preferably used as the lye. Alkaline-reacting salts are also suitable. The person skilled in the art is familiar with suitable pH-regulating compounds. The selection is thus not to be interpreted as a restriction of the invention.

In an optional and subsequent Step e), a layer of aluminium oxide is applied to the aluminium oxide phosphate/hollow sphere layer in such a way that the pH value is maintained in the range from about 4 to 9, e.g. by parallel addition of an alkaline and an acidic aluminium component (e.g. sodium aluminate/aluminium sulphate), or by addition of an alkaline aluminium component, such as sodium aluminate, and an acid, e.g. sulphuric acid or hydrochloric acid, or by addition of an acidic aluminium component, such as aluminium sulphate, together with a lye, e.g. NaOH. In this context, either the components can be added in such a way that the pH value remains constant at a value in the range from about 4 to 9, or the components can be added in such a combination that the pH value varies within the pH value range from about 4 to 9 during addition. The person skilled in the art is familiar with these procedures. Suitable for setting the pH value are, for example, lyes or acids (e.g. NaOH/$H_2SO_4$), or alkaline or acid-reacting salt solutions (e.g. sodium aluminate/aluminium sulphate). It has proven particularly advantageous to perform treatment at the pH value previously set in Step d).

As and when required, the pH value is subsequently set to between about 5 and 8 in an optional Step f), e.g. using lyes/acids (e.g. NaOH/$H_2SO_4$ or HCl) or using alkaline/acidic salt solutions, such as sodium aluminate/aluminium sulphate.

The quantity of the aluminium compounds used in Steps d), e) and f), calculated as $Al_2O_3$, is to be added to the quantity of $Al_2O_3$ already used in Step b). The sum total of the aluminium compounds used in Steps b) to f), calculated as $Al_2O_3$ and referred to the uncoated $TiO_2$ particle, is ideally about 1.0 to 9.0% by weight, preferably about 3.5 to 7.5% by weight, particularly 5.5% by weight. Similarly, the quantity of the phosphorus component possibly used in Steps d) and e), calculated as $P_2O_5$, is to be added to the quantity of $P_2O_5$ used in Step b). The sum total of the phosphorus compounds used in Steps b) to e), calculated as $P_2O_5$, is thus ideally about 1.0 to 5.0% by weight, preferably 1.5 to 3.5% by weight, and particularly 2.0 to 3.0% by weight, calculated as $P_2O_5$ and referred to the uncoated $TiO_2$ particle.

Together with the Al and the P component, other metal salt solutions, e.g. of Ce, Ti, Si, Zr or Zn, can be added to the suspension in Step b), subsequently being precipitated jointly onto the particle surface in Step d) as a phosphate or oxide in the aluminium oxide phosphate/hollow sphere layer.

It is furthermore possible, either before Step e) or after Step e), to apply a further inorganic layer as known from the prior art (e.g. compounds containing Zn, Ti, Si).

In a preferred embodiment of the method according to the present invention, the starting point is an alkaline $TiO_2$ suspension. To this end, Step a) first involves setting the suspension to a pH value of at least about 10 using suitable alkaline compounds, e.g. NaOH. If wet-milling is performed, this should ideally be done before the milling operation.

In Step b), an aluminium and a phosphorus component are then added to the suspension, each in the form of an aqueous solution. During addition of the components, the pH of the suspension is maintained at a value of at least about 10, preferably at least 10.5, and particularly preferably at least 11.

Sodium aluminate is particularly suitable as the alkaline aluminium component. If an acid-reacting compound is used, such as aluminium sulphate, the addition of which would reduce the pH value to below 10, it has proven advantageous to compensate for this effect by adding a suitable alkaline compound, such as NaOH. The person skilled in the art is familiar with suitable alkaline compounds and the quantities required for maintaining the pH at a value of at least 10.

In the case of phosphorus components whose addition would reduce the pH value to below 10, it has likewise proven advantageous to compensate for this effect by adding a suitable alkaline compound, such as NaOH. The person skilled in the art is familiar with suitable alkaline compounds and the quantities required for maintaining the pH at a value of at least 10.

The Al and the P component can be added to the suspension in any order, individually one after the other, or simultaneously.

In the subsequent Step c), the organic or inorganic hollow microbodies with a mean diameter of about 5 to 1,000 nm, preferably 400 to 600 nm, are added, in which context the pH value of the suspension does not drop below 10, preferably not below 10.5, particularly not below 11.

In the subsequent Step d), the pH-regulating component is added, such that a pH value in the range from 4 to 9 is obtained.

In an alternative embodiment of the method according to the invention, the surface treatment according to the invention is started in the acidic pH range.

In this case, Step b) involves the addition of such aluminium and phosphorus components that the pH value of the suspension is subsequently below 4. The person skilled in the art is at liberty to already reduce the pH value in Step a) by means of a suitable acid, or to reduce the pH value to below 4 in Step b) using a suitable combination of the components, adding an acid where appropriate. For example, the combination phosphoric acid/sodium aluminate or disodium hydrogenphosphate/aluminium sulphate is suitable. The components can be added to the suspension in any order, individually one after the other, or simultaneously.

In Step c), only hollow bodies are used that are stable at an acidic pH value.

In Step d), a pH-regulating component is again added, as a result of which a pH value in the range from 4 to 9 is obtained.

The surface-treated $TiO_2$ pigment is separated from the suspension by filtration methods known to the person skilled in the art, and the resultant filter cake is washed in order to remove the soluble salts. To improve the light-fastness of the pigment in the laminate, a nitrate-containing compound, e.g. $KNO_3$, $NaNO_3$, $Al(NO_3)_3$, can be added to the washed filter paste in a quantity of 0.05 to 0.5% by weight, calculated as $NO_3$, before or during subsequent drying. During subsequent milling, e.g. in a steam mill, an organic compound can be added to the pigment, taken from the range customarily used in the manufacture of $TiO_2$ pigments and familiar to the person skilled in the art, such as polyalcohols (trimethylolpropane). As an alternative to addition of the nitrate-containing compounds before or during drying, such substances can also be added during milling.

Compared to the reference pigment, the pigment manufactured according to this method displays improved opacity and is optimally suited to use in decorative laminating paper and decorative coating materials.

The surface treatment method according to the invention is customarily performed in batch mode. It is, however, also possible to perform treatment continuously, in which case suitable mixing equipment, such as is familiar to the person skilled in the art, must guarantee sufficiently thorough mixing.

An example of the present invention is described below:

EXAMPLE

A sand-milled $TiO_2$ suspension from the chloride process with a $TiO_2$ concentration of 350 g/l was set to a pH value of 10 with NaOH at 60° C. While stirring, 2.0% by weight. $Al_2O_3$ were added to the suspension in the form of sodium aluminate solution. After stirring for 15 minutes, 2.4% by weight. $P_2O_5$ were added in the form of disodium hydrogenphosphate solution. This was followed by stirring for a further 15 minutes. Next, 30% Ropaque Ultra Emulsion (polymer hollow spheres, Rohm & Haas), corresponding to a styrene/acrylic copolymer active substance content of 2% by weight referred to $TiO_2$, was added and stirred for a further 15 minutes. In the next step, the suspension was set to a pH value of 5 by adding aluminium sulphate solution corresponding to 2.6% by weight. $Al_2O_3$. Subsequently, 0.7% by weight. $Al_2O_3$ was added in the form of parallel addition of sodium aluminate and aluminium sulphate solution, such that the pH value was maintained at 5.

After stirring for 30 minutes, the suspension was set to a pH value of approx. 5.8 with the help of an alkaline sodium aluminate solution, filtered and freed of the water-soluble salts by washing. The washed filter paste was dried in a spray drier, adding 0.25% by weight $NO_3$ in the form of $NaNO_3$, and subsequently steam-milled.

A transmission electron micrograph of the example pigment shows the hollow bodies attached to the pigment surface in FIG. 1.

Reference Example

A sand-milled $TiO_2$ suspension from the chloride process with a $TiO_2$ concentration of 350 g/l was set to a pH value of 10 with NaOH at 60° C. While stirring, 2.0% by weight. $Al_2O_3$ were added to the suspension in the form of sodium aluminate solution. After stirring for 15 minutes, 2.4% by weight. $P_2O_5$ were added in the form of disodium hydrogenphosphate solution. Stirring for a further 15 minutes then followed. In the next step, the suspension was set to a pH value of 5 by adding aluminium sulphate solution, corresponding to 2.6% by weight. $Al_2O_3$. Subsequently, 0.8% by weight. $Al_2O_3$ was added in the form of parallel addition of sodium aluminate and aluminium sulphate solution, such that the pH value was maintained at 5.

After stirring for 30 minutes, the suspension was set to a pH value of approx. 5.8 with the help of an alkaline sodium aluminate solution, filtered and freed of the water-soluble salts by washing. The washed filter paste was dried in a spray drier, adding 0.25% by weight $NO_3$ in the form of $NaNO_3$, and subsequently steam-milled.

Test Methods and Test Results

Test Methods

For assessing the optical properties of the decorative laminating papers, and thus the quality of the titanium dioxide pigment, it is important to compare decorative laminating papers with an identical ash content. Sheets of decorative laminating paper with a sheet weight of roughly 80 g/m² and an ash content of roughly 30 g/m² were produced. The person skilled in the art is familiar with the procedure and the auxiliaries used.

The titanium dioxide content (ash) of a sheet and the pigment retention were subsequently determined.

Ash Content

The titanium dioxide content was determined by incinerating a defined weight of the produced paper in a rapid incinerator at 900° C. The $TiO_2$ content by mass (ash) in % by weight was obtained by weighing the residue. The following formula was used as the basis for calculating the ash content:

Ash content[g/m²]=(Ash[% by weight]×Grammage [g/m²])/100[%].

Retention

The retention is defined as the capacity to retain all inorganic substances in the sheet of paper on the wire of the paper machine. The "one-pass retention" determined here indicates the percentage retained during a single pass through the paper machine. The ash content in percent, referred to the content by mass of the pigment used relative to the total solids in the suspension, yields the retention:

$$\text{Retention } [\%] = \frac{\text{Ash } [\%] \times (\text{Pigment weight } [g] + \text{Pulp weight } [g])}{\text{Pigment weight } [g]}$$

Optical Properties

The optical properties of the pigments were determined in laminates.

To this end, the decorative laminating paper was impregnated with a modified melamine impregnating resin and pressed into laminates. The sheet to be impregnated with resin was completely immersed in the melamine resin solution, subsequently drawn between two doctor blades to ensure application of a specific amount of resin and then immediately pre-condensed at 130° C. in a recirculating-air drying oven. The amount of resin applied was 120 to 140% of the weight of the sheet. The sheet had a residual moisture content of approx. 6% by weight. The condensed sheets were combined into books with phenolic resin-impregnated core papers and white/black underlay paper.

The laminate structure used for assessing the test pigments comprised 11 layers: decorative laminating paper, white/black underlay, core paper, core paper, core paper, white underlay, core paper, core paper, core paper, white/black underlay, decorative laminating paper.

The books were pressed for 300 seconds with the help of a Wickert Type 2742 laminating press at a temperature of 140° C. and a pressure of 900 N/cm².

The optical properties of the laminates were measured using a commercially available spectrophotometer.

In order to assess the optical properties of the laminates, the optical values of the decorative laminating papers (CIELAB L*, a*, b*) to DIN 6174 were determined with the help of the ELREPHO® 3000 calorimeter over white and black underlay. The opacity is a measure of the light transmission of the paper. The following parameters were selected as a measure of the opacity of the laminates: CIELAB $L^*_{black}$, the brightness of the laminates measured over black underlay paper, and the opacity value L [%]=$Y_{black}/Y_{white}$×100, determined from the Y-value of the decorative laminating papers measured over black underlay paper ($Y_{black}$) and the Y-value measured over white underlay paper ($Y_{white}$).

Test Results

The Table shows the test results for laminates produced using the pigment according to the invention (Example) and a reference pigment (Reference example). Compared to the reference pigment, the pigment according to the invention demonstrates improved opacity.

TABLE

| | Pigment Opacity | | Retention |
|---|---|---|---|
| | $L^*_{black}$ | L [%] | [%] |
| Example | 90.3 | 91.1 | 69 |
| Reference example | 90.1 | 90.7 | 71 |

Other alterations and modifications of the invention will likewise become apparent to those of ordinary skill in the art upon reading the present disclosure, and it is intended that the scope of the invention disclosed herein be limited only by the broadest interpretation of the appended claims to which the inventors are legally entitled.

What is claimed is:

1. A titanium dioxide pigment comprising: titanium dioxide particles, each of the particles having a surface,
   whereby a coating is located on the titanium dioxide particle surface,
   the coating comprising aluminum phosphate, aluminum oxide and hollow bodies.

2. The titanium dioxide pigment of claim 1 whereby the hollow bodies have an average diameter of about 5 to 1000 nm.

3. The titanium dioxide pigment of claim 1 whereby the sum of the aluminum oxide coating and aluminum phosphate coating is about 1.0 to 9.0% by weight calculated as $Al_2O_3$.

4. The titanium dioxide pigment of claim 1 whereby the aluminum phosphate coating is about 1.0 to 5.0% by weight calculated as $P_2O_5$.

5. A method for manufacturing coated titanium dioxide pigment particles comprising:
   providing an aqueous suspension having a pH value, the suspension comprising uncoated titanium dioxide particles;
   adding an aluminum-containing component and a phosphorus-containing component;
   adding a component comprising hollow bodies; and
   setting the pH value of the suspension to a value in the range of about 4 to 9.

6. The method of claim 5 wherein:
   the pH value of the aqueous suspension is at least about 10 and the pH value of the suspension is kept at least about 10 when adding the components.

7. The method of claim 5 wherein:
   the pH value of the suspension turns to below about 4 when adding the aluminum-containing component and the phosphorus-containing component.

8. The method of claim 5 wherein:
   the hollow bodies have an average diameter of about 5 to 1000 nm.

9. The method of claim 5 wherein:
   the aluminum-containing component is about 1.0 to 9.0% by weight calculated as $Al_2O_3$.

10. The method of claim 5 wherein:
    the phosphorus-containing component is about 1.0 to 5.0% by weight calculated as $P_2O_5$.

11. The method of claim 5 further comprising:
    applying a further aluminum-oxide coating at a pH value of about 4 to 9.

12. The method of claim 11 further comprising:
    setting the pH value of the suspension to about 5 to 8.

13. The method of claim 12 further comprising:
    treating the pigment particles with nitrate, wherein the pigment particles contain up to about 1.0% by weight nitrate.

14. The method of claim 12 further comprising:
    milling the pigment particles with an organic compound.

15. The method of claim 5 wherein in the step of adding an aluminum-containing component and a phosphorus-containing component, the components are added simultaneously.

16. A method for manufacturing coated titanium dioxide pigment particles comprising:
    providing an aqueous suspension having a pH value, the suspension comprising uncoated titanium dioxide particles, whereby the pH value is at least about 10;
    adding an aluminum-containing component and a phosphorus-containing component, whereby the pH value of the suspension is kept at least about 10;
    adding a component comprising hollow bodies;
    setting the pH value of the suspension to a value in the range of about 4 to 9;
    applying a further aluminum-containing coating.

17. A decorative laminating paper comprising:
    paper impregnated with titanium dioxide particles, the particles coated with aluminum phosphate, aluminum oxide and hollow bodies.

18. A decorative coating material comprising:
    material impregnated with titanium dioxide particles, the particles coated with aluminum phosphate, aluminum oxide and hollow bodies.

19. A process for manufacturing decorative laminating paper comprising:
    impregnating paper with an aqueous suspension of titanium dioxide particles coated with aluminum phosphate, aluminum oxide and hollow bodies.

20. A process for manufacturing decorative coating material comprising:
    impregnating material with an aqueous suspension of titanium dioxide particles coated with aluminum phosphate, aluminum oxide and hollow bodies.

* * * * *